United States Patent [19]

Yamamoto et al.

[11] Patent Number: 5,512,672
[45] Date of Patent: Apr. 30, 1996

[54] CURDLAN SULFATE

[75] Inventors: Naoki Yamamoto; Hideki Nakashima, both of Yamaguchi; Toshiyuki Uryu, Tokyo; Takashi Yoshida, Tokyo; Kei Matsuzaki, Tokyo; Yutaro Kaneko, Tokyo; Toru Mimura, Tokyo, all of Japan

[73] Assignees: Ajinomoto Co., Inc.; Fujirebio, Inc., both of Tokyo, Japan

[21] Appl. No.: 76,174

[22] Filed: Jun. 14, 1993

Related U.S. Application Data

[63] Continuation of Ser. No. 953,195, Sep. 29, 1992, abandoned, which is a continuation of Ser. No. 799,885, Dec. 2, 1991, abandoned, which is a continuation of Ser. No. 447,617, Dec. 8, 1989, abandoned, which is a continuation-in-part of Ser. No. 415,462, Oct. 2, 1989, abandoned, which is a continuation of Ser. No. 216,022, Jul. 7, 1988, abandoned.

[51] Int. Cl.[6] .................... C07B 37/00; A61K 31/70
[52] U.S. Cl. ............... 536/118; 536/123.1; 536/123.12
[58] Field of Search .................... 536/20, 21, 51, 536/54, 112, 118, 122; 514/54–55, 59–60, 885

[56] References Cited

U.S. PATENT DOCUMENTS

| | | | |
|---|---|---|---|
| 3,720,659 | 3/1973 | Guiseley et al. | 536/2 |
| 4,389,523 | 6/1983 | Okajima | 536/59 |
| 4,590,181 | 5/1986 | McCarthy | 514/54 |
| 4,783,446 | 11/1988 | Neushul | 514/54 |
| 4,840,941 | 6/1989 | Ueno et al. | 514/59 |

FOREIGN PATENT DOCUMENTS

| | | |
|---|---|---|
| 0232744 | 8/1987 | European Pat. Off. . |
| 0293826 | 12/1988 | European Pat. Off. . |

OTHER PUBLICATIONS

Yamamoto et al. (1987) Archives of AIDS Res., vol. 1, pp. 45–56.
Taguchi et al. (1985) Proceedings of the Seventh Symposium on Host Defense Mechanisms Against Cancer, Hakone, Nov. 8–10, 1985, Intl. Congress Series 738.
Baba et al. (1988) Antiviral Research, vol. 9, pp. 335–343.
Ueno et al. (1987) Lancet, Jun. 13, 1987, p. 1379.
Mitsuya et al. (1988) Science, vol. 240, pp. 646–649.
Nakashima et al. (1987) Jpn. J. Cancer Res. (Gann) vol. 78, pp. 1164–1168.
Baba et al. (1988) Antimicrob. Agents and Chems., vol. 32, No. 11, pp. 1742–1745.
Yoshida et al. (1988) Biochem. Pharmacol., vol. 37, No. 15, pp. 2887–2891.

*Primary Examiner*—Douglas W. Robinson
*Assistant Examiner*—Gary L. Kunz
*Attorney, Agent, or Firm*—Oblon, Spivak, McClelland, Maier & Neustadt

[57] ABSTRACT

A beta-1,3-glucan of sulfated curdlan having a sulfur content of 12.4 to 17% and an average molecular weight of 27,000 to 330,000 daltons. Sulfate curdlan exhibits strong HIV inhibitory activity with little anticoagulant activity and little toxicity.

2 Claims, No Drawings

CURDLAN SULFATE

This application continuation of application Ser. No. 07/953,195 filed on Sep. 29, 1992, now abandoned, which is a continuation of 07/799,885, filed Dec. 2, 1991, now abandoned, which is a continuation of 07/447,617, filed Dec. 8, 1989, now abandoned, which is a CIP of 07/415,462, filed Oct. 2, 1989, now abandoned, which is a continuation of 07/216,022, filed Jul. 7, 1988, now abandoned.

BACKGROUND OF THE INVENTION

1. Field of the Invention

The present invention relates to an anti-viral agent containing a modified and low-molecular weight β-1,3-glucan having a very potent anti-human immunodeficiency virus (anti-HIV) activity.

2. Description of the Background

It is known that inorganic ion-containing organic high polymer compounds are effective for the prevention and treatment of retroviral infectious diseases. See, for example, Japanese Patent Application Laid-Open No. 62-215529. In particular, sulfates of polysaccharides are also known to be effective therefor. See, for example, Japanese Patent Application Laid-Open No. 63-45223. However, the anti-HIV activity of these compounds is not well understood. Moreover, the necessary structure thereof appears to be correlated to a blood anti-coagulating activity which is also manifested. This anti-coagulating activity is, of course, undesirable in the use of the compounds. Unfortunately, practically useful sulfated polysaccharides, without the above side effects, are not presently available.

Further, with respect to the method of sulfating polysaccharides, and the method of isolating the sulfated polysaccharides, a detailed investigation has been conducted with a dextran sulfate of α-1,6-glucan (Carbohydrate Research, 21 (1972), 420–426), but a detailed investigation on β-1,3-glucan has not yet been conducted.

Thus, at present, a need continues to exist for compounds which exhibit a more potent anti-HIV activity, but which also have a reduced anti-coagulating activity. It would also be desirable to develop such compounds having fewer impurities than are found in conventional agents for HIV therapy.

SUMMARY OF THE INVENTION

Accordingly, it is an object of the present invention to provide a substance which has excellent anti-HIV activity.

It is also an object of the present invention to provide a substance having reduced anti-coagulating activity, and having fewer impurities contained therein.

The above objects and others are provided by a modified and low molecular weight β-1,3-glucan having a sulfur content of from about 14.5±2.5% and a weight average molecular weight by gel filtration of from about 20,000 to 330,000.

DETAILED DESCRIPTION OF THE PREFERRED EMBODIMENTS

In accordance with the present invention, it has been discovered that the above activities are obtained by a modified and low molecular weight β-1,3-glucan of a sulfated curdlan or lentinan, having, in general, a sulfur content of at least 12% or more and having a weight average molecular weight by gel filtration of at least 20,000 or more. The β-1,3-glucans of the present invention have excellent anti-HIV activity and weak anti-coagulant activity.

In particular, the present invention provides:

(A) a modified and low molecular weight β-1,3-glucan from curdlan as a raw material, which has a sulfur content of about 14.5% + 2.5% and a weight average molecular weight of from about 20,000 to 330,000, and (B) a modified and low molecular weight β-1,3-glucan from lentinan as a raw material, which has a sulfur content of about 14.5% ±2.5% and a weight average molecular weight of from about 20,000 to 330,000.

The above-mentioned compound (A) may be obtained from a known curdlan as a raw material. As curdlan has a low solubility, it is important that the curdlan first be activated so as to elevate the solubility. The activating treatment to be applied to curdlan for this purpose entails placing the curdlan in a suspension in a polar organic solvent and then a non-polar organic solvent step-by-step in order. Further, in sulfation, even a slight amount of water in the reaction system would substantially interfere with the reaction. Accordingly, as curdlan is highly hygroscopic, it is preferable to dry the curdlan to lower the water content thereof to about 2% or less for the purpose of effecting the reaction quantitatively and in a stable manner. Dimethylsulfoxide (hereinafter referred to as "DMSO") and a sulfating agent such as piperidine sulfate are also fully dried and then used in the sulfation reaction, whereby the low molecular weight production and sulfation are effected simultaneously. As curdlan is hardly soluble in DMSO, it is preferred to stir the same in DMSO for several hours to overnight at room temperature or for several hours at 60° C. to 90° C. for complete dissolution. Next, the resulting solution is reacted with a sulfating agent such as piperidine sulfate, which is used in an amount of from about 1 to 3 equivalents per glucose residue, whereupon the reaction temperature is about 60° C. to 90° C. and the reaction time is from about 1 hour to 24 hours. When stronger conditions than the above are used, for example, 3 equivalents or more of piperidine sulfate, a reaction temperature of higher than 90° C. or a reaction time of longer than 24 hours, the reaction is often accompanied by a side-reaction with coloration, excess low-molecularization or release of sulfate radical.

In order to isolate the sulfated curdlan from the reaction solution, the reaction mixture may be neutralized with, for example, sodium hydroxide or sodium hydrogen carbonate and then subjected to dialysis so as to isolate the sulfated curdlan. However, as the dialysis method requires a long time and removal of impurities is insufficient by this method, it is preferred that the product be isolated from the reaction solution in the form of a precipitate and then separated from the DMSO or other solvents used. For precipitation of the product, which is a high molecular weight polymeric substance, adding only the organic solvent to the reaction mixture is inadequate. Thus, in accordance with the present invention, it has been found that the addition of a salt together with an organic solvent is effective for efficient precipitation of the product in the form of its sodium salt. The salt to be used for the purpose may be an inorganic salt such as sodium chloride. However, as the salt is an impurity, and should, therefore, be present in the smallest amount in view of purification of the product, the salt is desirably an organic solvent-soluble salt which can be washed and removed with an organic solvent, for example, sodium acetate. However, other organic solvent-soluble salts may be used.

The precipitate obtained, which contains the product and the salt, is washed several times with an organic solvent and then is dissolved in water. The washing may be batchwise effected by repeated washing and treatment with a centrifuge. However, use of a ceramic membrane is more preferred as the washing can be effected continuously.

The aqueous solution containing the product can be de-salted by passing the same through an ultrafiltration membrane, whereupon a ceramic membrane can also be used. The resulting aqueous solution containing only the product may be directly freeze-dried. Where the product is obtained in the form of a powder, a proper amount of an organic solvent-soluble salt may be added to the aqueous solution and the intended product can be precipitated with an organic solvent.

The above-mentioned compound (B) is obtained from a known lentinan as a raw material. In the sulfation of lentinan, even a slight amount of water in the reaction system would substantially interfere with the reaction. Accordingly, as lentinan is highly hygroscopic, it is preferable to dry the same to lower the water content thereof to 2% or less prior to the reaction for the purpose of effecting the reaction quantitatively and stably. DMSO and a sulfating agent such as piperidine sulfate are also fully dried and then used in the sulfation reaction. As lentinan is hardly soluble in DMSO, it is important that lentinan be stirred in DMSO for several hours at room temperature for complete dissolution.

In order to isolate the product from the reaction solution, the same process may be used as that for obtaining the product when using curdlan as a raw material.

In the above process, acetone is an example of a polar solvent which may be used, and diethyl ether is an example of a non-polar solvent which may be used. However, other polar and non-polar solvents may be used, and in view of the present disclosure, such other solvents are readily known to those of ordinary skill in the art.

Having described the present invention, reference will now be made to certain examples which are offered solely for the purpose of illustration and are not intended to be limitative.

Example 1: Preparation of Modified Low-Molecularized β-(1,3)-glucan from Curdlan as a Raw Material 1 g of curdlan was suspended in 50% acetone for 24 hours and then suspended in 75% acetone for 24 hours, in 100% acetone for 24 hours and in 100% ether for 24 hours in that order. Afterwards, the precipitate formed was dried overnight under reduced pressure over phosphorus pentoxide. 1 g of the thus activated dry curdlan was added to 100 ml of DMSO as previously dried with Molecular Sieve 4A and stirred overnight at room temperature, whereby the former was dissolved in the latter. 2.5 g of piperidine sulfate was added thereto and heated up to 85° C., whereupon the reaction was continued for 1 hour under this condition. After completion of the reaction, the reaction mixture was cooled with water and 500 ml of methanol solution of 5% sodium acetate was added thereto, whereupon the product was precipitated out. The resulting precipitate was washed twice with 100 ml of methanol and then dissolved in 100 ml of water, and the resulting solution was desalted through an ultrafiltration membrane with a cutoff for compounds having a molecular weight of 10,000.

To 100 ml of aqueous solution of the thus desalted product was added 400 ml of methanol solution of 5% sodium acetate, whereby the product was precipitated out. The precipitate was washed twice with 100 ml of methanol and then dried under reduced pressure to obtain 1.7 g of the intended product of modified and low-molecularized β-(1,3)-glucan (Compound No. CS-1).

S-content (Elementary Analysis):14.4%

Weight Average Molecular Weight (Gel Filtration Method): 113,000

In the same manner as above, other modified and low-molecularized β-1,3-glucans of Compound Nos. CS-2 to CS-11 were obtained.

Example 2: Preparation of Modified Low-Molecularized β-1,3-glucan from Lentinan as a Raw Material:

1 g of lentinan as dried overnight under reduced pressure over phosphorus pentoxide was added to 100 ml of DMSO as previously dried with Molecular Sieve 4A and stirred for 2 hours at room temperature and dissolved therein. After 2.3 g of piperidine sulfate was added thereto, the whole was heated up to 85° C. and then reacted for 1 hour under this condition. After completion of the reaction, the reaction mixture was cooled with water, and 50 ml of 30% sodium acetate and then 600 ml of acetone were added thereto to precipitate the product. The resulting precipitate was washed several times with 200 ml of acetone and then dissolved in 100 ml of water and then de-salted through a 0.14 μm ceramic membrane. To 100 ml of aqueous solution of the thus de-salted product was added 400 ml of methanol solution of 5% sodium acetate whereby the product was precipitated out. The precipitate was washed twice with 100 ml of methanol and then dried under reduced pressure to obtain 1.8 g of the intended product of modified and low-molecularized β-1,3-glucan (Compound No. LS-1).

S-content (Elementary Analysis): 14.2%

Weight Average Molecular Weight (Gel Filtration Method): 158,000

In the same manner as above, other modified and low-molecularized β-(1,3)-glucans of Compound Nos. LS-2 to LS-8 were obtained.

Example 3: Determination of Anti-HIV Activity and Anti-Coagulating Activity of Modified Low-Molecularized β-(1,3)-Glucans:

MT-4 cells were infected with HTLV-III at moi=0,002. The specimen to be examined was diluted with a medium in a determined concentration and mixed with the infected cells in a ratio of 1/1, and $30 \times 10^4$ cells/ml were incubated. 6 days after incubation, the number of living cells and the antigen-positive ratio were determined.

The specimen to be examined was blended with 50 parts by volume of rat plasma and 1 part by volume of a solution of the test substance as stepwise diluted with a physiological salt solution and the activated part thromboplastic time (APTT) of the specimen was determined. The concentration of the test substance to prolong APTT twice was obtained and this was compared with the concentration of sodium heparin solution (whose titer of anti-coagulating activity is known) to prolong APTT of the control specimen twice, whereby the anti-coagulating activity of the test substance was represented as the titer of sodium heparin by unit/mg. The results were summarized in the following Table.

|  | S-Content (%) | Weight Average Molecular Weight (× 10⁴) | Anti-Coagulating Activity (μ/mg) | 3.3 μg/ml | | 10 μg/ml | |
|---|---|---|---|---|---|---|---|
|  |  |  |  | Percentage of Living Cells (%) | Percentage of Positive Antigen (%) | Percentage of Living Cells (%) | Percentage of Positive Antigen (%) |
| DS-1 | 17.9 | 1.7 | 38.6 | 2.1 | >90 | 93 | <1 |
| DS-2 | 17.9 | 12.2 | 71.9 | 1.5 | >90 | 93 | <1 |
| LS-1 | 14.2 | 15.8 | 9.0 | 107 | <1 | 100 | <1 |
| LS-2 | 15.2 | 7.3 | 15.0 | 95 | <1 | 84 | <1 |
| LS-3 | 12.5 | 14.9 | 8.9 | 121 | n.a. | 103 | n.a. |
| LS-4 | 13.4 | 11.6 | 11.2 | 90 | <1 | 99 | <1 |
| LS-5 | 15.2 | 30.5 | 11.1 | 89 | <1 | 103 | <1 |
| LS-6 | 12.8 | 26.3 | 11.2 | 77 | <1 | 101 | <1 |
| LS-7 | 11.7 | 11.4 | n.a. | 3.2 | >90 | 46 | >90 |
| LS-8 | 10.7 | 17.4 | 10.6 | 1.6 | >90 | 3.2 | >90 |
| CS-1 | 14.4 | 11.3 | 10.9 | 104 | <1 | 102 | <1 |
| CS-2 | 12.4 | 33.0 | 16.5 | 112 | <1 | 103 | <1 |
| CS-3 | 14.0 | 4.5 | 9.5 | 113 | <1 | 99 | <1 |
| CS-4 | 13.1 | 10.2 | n.a. | 107 | <1 | 93 | <1 |
| CS-5 | 12.0 | 7.2 | n.a. | 1.9 | >90 | 14 | >90 |
| CS-6 | 11.7 | 13.1 | n.a. | 0 | >90 | 4.5 | >90 |
| CS-7 | 16.2 | 2.7 | 15.3 | 100 | <1 | 103 | <1 |
| CS-8 | 14.7 | 15.2 | 16.2 | 115 | <1 | 114 | <1 |
| CS-9 | 12.8 | 22.9 | 12.7 | 104 | <1 | 110 | <1 |
| CS-10 | 16.8 | 6.5 | 11.2 | 94 | <1 | 97 | <1 |
| CS-11 | 14.9 | 2.0 | 5.8 | 0.6 | >90 | 0.6 | >90 |

D.S.: Dextran Sulfate
L.S.: Modified Low-Molecularized Lentinan
C.S.: Modified Low-Molecularized Curdlan
n.a.: not analyzed Thus, in accordance with one aspect of the present invention, a ceramic membrane is used to effect the purification of sulfated polysaccharides, in particular, the purification of the β-1,3-glucans of the present invention.

In accordance with another aspect of the present invention, a modified and low molecular weight β-1,3glucan of a sulfated curdlan or lentinan is provided having an excellent anti-HIV activity, and a greatly reduced or weaker anti-coagulating activity as compared to dextran sulfate.

What is claimed as new and desired to be secured by letters patent of the United States is:

1. A β-1,3-glucan of a sulfated curdlan having a sulfur content of about 12.4 to 17%, and an average molecular weight by gel filtration of from about 27.000 to 330,000.

2. The low molecular weight β-1,3glucan of claim 1, having a sulfur content of 14.4%, and a molecular weight of about 113,000.

* * * * *